United States Patent [19]

Berry, Jr. et al.

[11] 4,152,854
[45] May 8, 1979

[54] FOLDABLE SAFETY SIGN

[75] Inventors: Bernie B. Berry, Jr.; Myron F. Melvin, both of Indianapolis, Ind.

[73] Assignee: Inland Industries Inc., Indianapolis, Ind.

[21] Appl. No.: 845,641

[22] Filed: Oct. 26, 1977

[51] Int. Cl.$^2$ .............................................. G09F 15/00
[52] U.S. Cl. ...................................... 40/610; 340/109
[58] Field of Search ...................... 116/28 R; 340/109; 40/592, 610, 606

[56] References Cited

U.S. PATENT DOCUMENTS

| 2,155,300 | 4/1939 | Bybee | 40/610 |
| 3,292,291 | 12/1966 | Kelley | 40/592 |
| 3,685,162 | 8/1972 | Haun | 40/606 |
| 3,761,890 | 9/1973 | Fritts | 40/592 |
| 3,772,811 | 11/1973 | Alsup | 40/592 |

Primary Examiner—Louis G. Mancene
Assistant Examiner—Wenceslao J. Contreras
Attorney, Agent, or Firm—Woodard, Weikart, Emhardt & Naughton

[57] ABSTRACT

Disclosed is a vehicle-mounted sequential safety arrow sign which folds to an aerodynamically streamlined configuration when the vehicle is moving and, when erected, provides a sequential lamp, directional indicating display for passing traffic. The display is carried jointly on 3 hinged panels which are folded into a triangular prism configuration by an articulated lever system.

5 Claims, 7 Drawing Figures

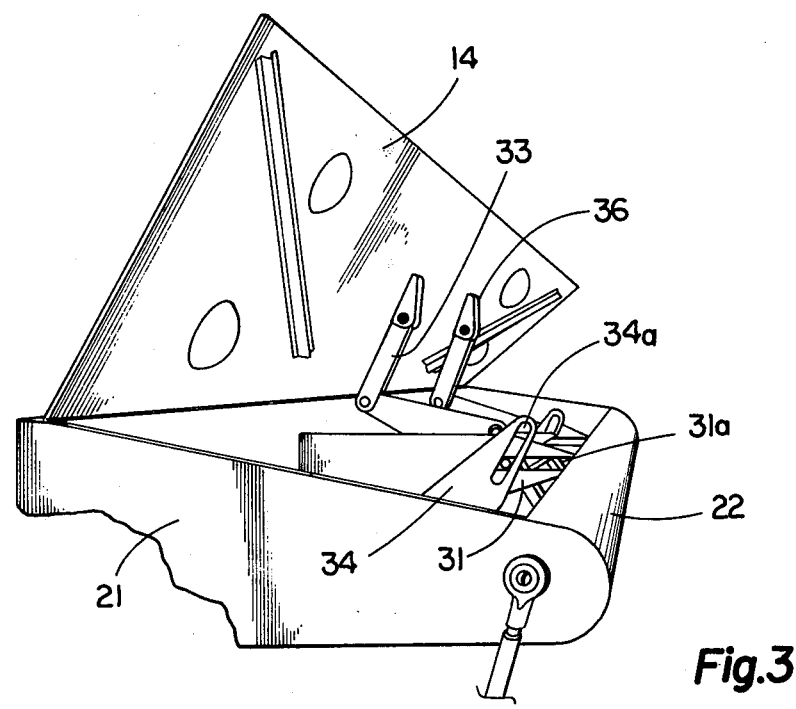
Fig. 3
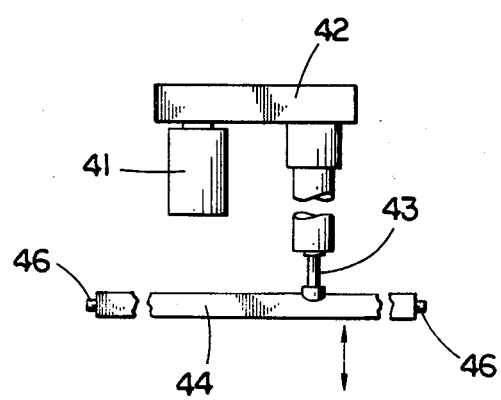
Fig. 4
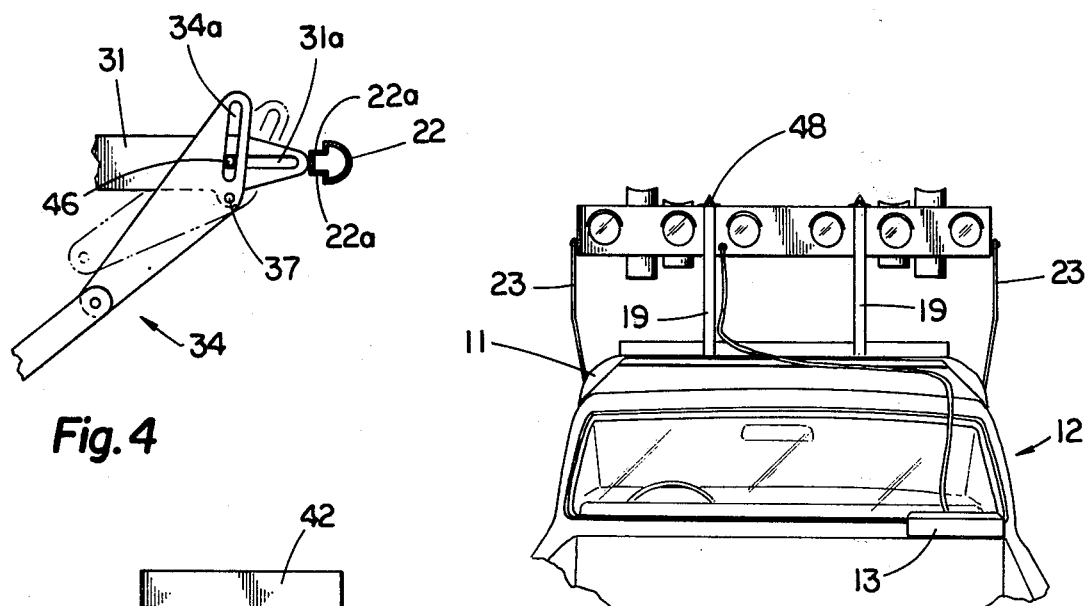
Fig. 5
Fig. 7

FOLDABLE SAFETY SIGN

BACKGROUND OF THE INVENTION

Vehicle mounted sequential arrow illuminated signs have been in use for several years. Conventionally, they are used by utility and street maintenance crews to route traffic around a work site. Where normal auto and truck traffic are fast moving, on interstate highways for example, the blinking electrically illuminated arrow must be relatively large and must, to be effective, be displayed against a large, properly contrasting background, usually a black, planar surface. State and municipal requirements for these directional traffic regulating displays have recently become more stringent. Larger arrow configurations, containing a minimum of fourteen lamps, (usually of high-intensity sealed beam type) and correspondingly larger background plates or panels are now typical requirements.

Because these large background plates offer substantial aerodynamic resistance, often dangerous, to the transporting vehicle, a rugged, trouble-free, power-operated folding background or display plate provides a highly desirable solution to this problem.

An object of the present invention is to provide a sign, as described above, which, in folded condition, presents a streamlined, triangular prism configuration having minimum drag, with the apex line leading or facing forward in the direction of motion of the vehicle. The movement of the upper and lower plates, into and out of folded position, is accomplished by means of a power-operated lever system which moves the plates smoothly and rapidly and which is enclosed by the plates when they are in folded position. The dual directional arrow configuration formed by the lamps mounted on the hinged plates is such that, with the assembly in folded condition, the central, supporting plate displays horizontally aligned lamps which can be blinked as a non-directional warning or caution signal.

BRIEF DESCRIPTION OF THE DRAWINGS

FIG. 3 is a perspective view similar to FIG. 1 but showing the sign between folded and erected positions.

FIG. 4 is a fragmentary, enlarged side view of the motion transmission linkage.

FIG. 5 is a fragmentary, top plan view of the power means for the apparatus.

FIG. 7 is a rear view of the sign in folded position.

DESCRIPTION OF THE PREFERRED EMBODIMENT

Figure 1:
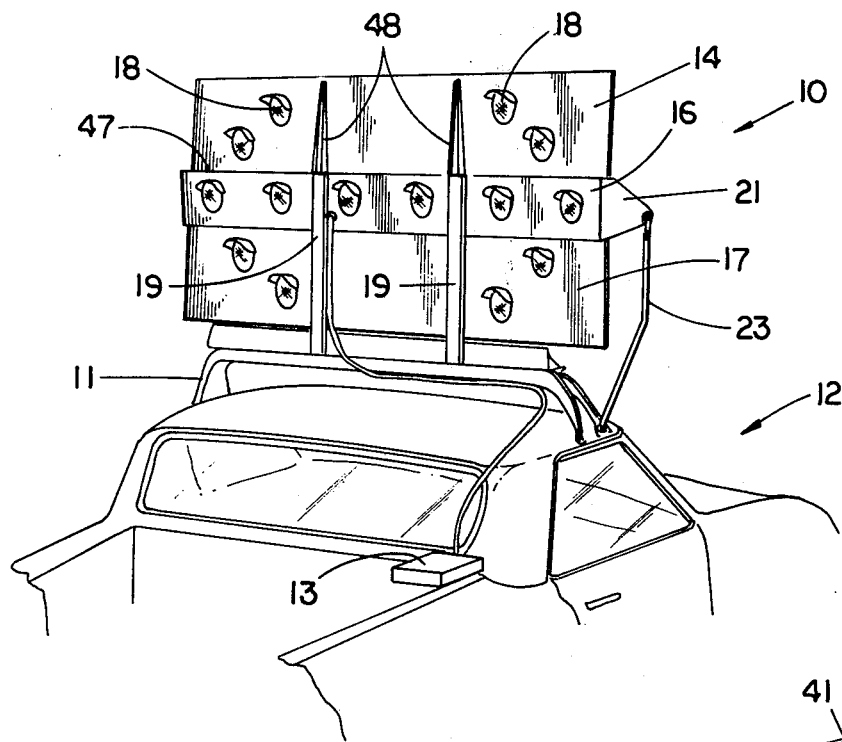
FIG. 1 is a perspective view of the erected sign mounted on a vehicle.

Referring initially to FIG. 1, the sign structure 10 includes a base support member 11 which is adapted to extend transversely across and to be secured to the roof of a vehicle such as the pick-up truck 12. A control panel 13 may be mounted as shown or may be mounted on the dashboard within the cab of the vehicle.

The sign proper consists of three plates or panels 14, 16 and 17 of rectangular configuration which, in erected position as shown in FIG. 1, are positioned in edge-to-edge configuration to form a flat sign face, the plates being hinged together along their adjacent side margins. The plates each carry a portion of the lamps 18, preferably of the sealed-beam, high-intensity type, making up the arrow configuration. The lamps are operated, as is conventional, to provide sequential energization with one or both of the five lamp arrow heads being part of the illuminated sequence to give directional instruction to approaching motorists.

Figure 2:
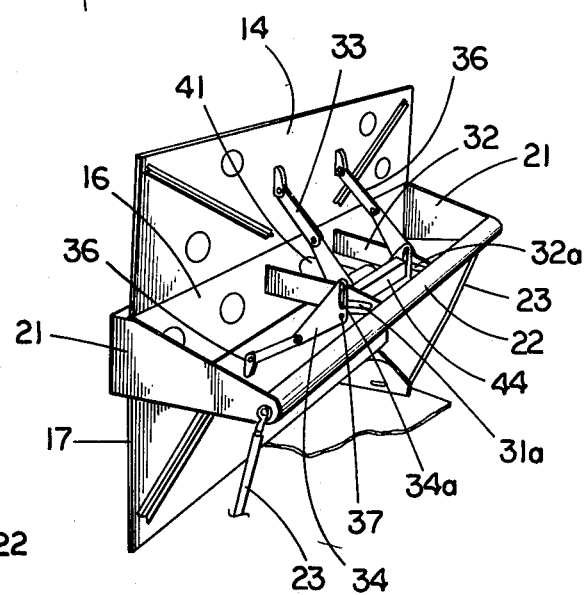
FIG. 2 is a perspective view of the sign taken from its rear face.
Figure 6:
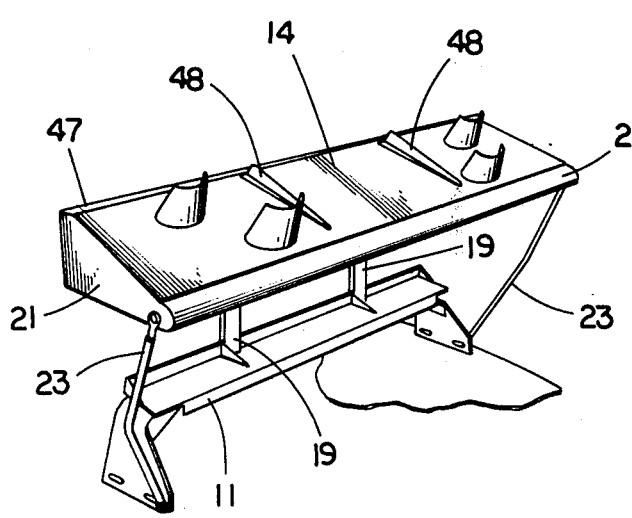
FIG. 6 is a perspective view similar to FIG. 2 but showing the sign in folded position.

As may best be seen in FIGS. 1 and 7, the central plate 16 is supported on upright braces 19 which extend vertically from the support member 11. Referring to FIGS. 2 and 6, the central plate 16 carries triangularly shaped members 21 which extend outwardly from the sign face in the direction of motion of the vehicle. A transverse member 22 (FIG. 2) extends between the tips of the members 21 and, as may be seen in FIG. 4, has an upper and lower inset portion 22a to accommodate the free marginal area of the plates 14 and 17 when they are in their folded positions of FIG. 6. Bracing struts 23 extend from the tips of the members 21 to the base support member 11.

FIG. 1 shows the structure in erected or display position and FIG. 6 illustrates the folded position in which a triangular prism configuration is presented with the apex (member 22) leading in the direction of motion of the vehicle. Movement of the plate components between these positions is accomplished by a power-actuated lever system to be described with reference to FIGS. 2, 3, 4 and 5.

As may be seen in FIG. 2, the upper plate 14 has two spaced, parallel arms 31 and 32 extending from its rear face. Each of the arms 31 and 32 has a pair of articulated braces 33, 34 and 36, 37, respectively, pivotally attached to it, the legs of each of the braces being pivotally joined intermediate the length of the brace. One end of each of the articulated braces 31 and 32, is pivotally joined to the rear face of plate 14 and braces 34 and 37 are pivotally joined to plate 17. The opposite ends of the braces are pivotally joined to the appropriate one of the arms 31 and 32. The pivotal junction of brace 37 with plate 17 is identified at 36 in FIG. 2 and its pivotal connection to arm 31 is identified at 37 in FIGS. 2 and 4. As will be evident from FIG. 2, the brace 34 is pivoted to arm 31 adjacent the lower margin of the arm and brace 33, extending adjacent the opposite side of arm 31 is pivotally joined to the arm adjacent the upper margin of the arm. Identically, the braces 36 and 37 are disposed on opposite sides of arm 32 and pivoted to the arm adjacent its lower and upper margins, respectively.

As may be seen in FIGS. 2 and 4 each of the braces, adjacent its pivotal connection to the appropriate arm, is provided with an elongated transverse slot, the slot in brace 34 being identified at 34a as an example. Each of the arms 31 and 32 also has an elongated, longitudinal slot adjacent its tip, the slots being identified at 31a and 32a, the trace of these slots, in the plane of the braces, intersecting the transverse slots in the braces.

The power means for moving the braces in scissors-like fashion includes a reversible electric motor 41 (FIGS. 2 and 5) mounted on the rear face of central plate 16. A rack and pinion assembly in the housing 42 (FIG. 5) transforms the rotary motion of the motor shaft into rectilinear motion of the shaft 43 and its attached cross-head 44. Protruding at the opposite ends of the cross-head 44 are abutments 46 and, as will be evident from FIGS. 2 and 4, these abutments extend through the registering portions of the slots 31a and the transverse slots in braces 33 and 34 and, similarly through the registering portions of the slot 32a in arm 32 and the transverse slots in braces 36 and 37.

As may best be seen in FIGS. 1 and 2, the central plate 16 has a flange 47 extending horizontally from its front face adjacent its upper margin. The front face of the upper plate 14 carries spaced, vertically-extending, reinforcing members 48. The members 48 are spaced to align with the upright braces 19. The lower, wider ends of the members 48 engage the flange 47 when the sign in an erected position and function, with braces 19, to rigidify the structure.

In operation, referring to FIGS. 2, 3, 4 and 6, to move the sign from its erected position of FIG. 2 to its folded position of FIG. 6, the motor 41 is energized in proper direction by a suitable manual control switch on the control panel 13. This serves to move cross-head 44 outwardly, advancing abutments 46 to the right as viewed in FIG. 4. Referring particularly to FIG. 4, this motion of the abutment rightwardly in slot 31a in arm 31 applies a clockwise force moment to brace 34 about its pivot 37 moving it through its broken line position of FIG. 4. The articulated brace breaks at its central pivot and collapses through the intermediate position shown in FIG. 3. The other adjacent articulated brace 33 is pivoted counterclockwise (as viewed in FIG. 2) by motion of the cross-head 44. Identically, the articulated braces 36 and 37 are also moved in scissors-like fashion by motion of the cross-hand. This brings the upper plate 14 and lower plate 17 through their position of FIG. 3 into folded position (FIG. 6) in which the free margins of plates 14 and 17 rest in the inset portions 22a (FIG. 4) of the member 22. Reverse rotation of motor 41, drawing cross-head 44 inwardly, serves to reverse the scissoring motion of the braces, raising the plates to erected position.

Because of the substantial mechanical advantage of the lever system provided by the articulated braces, movement of the plates 14 and 17 is rapid and smooth. In folded position, the assembly presents a smooth, streamlined contour of triangular prism configuration with the apex facing in the direction of travel of the vehicle on which the assembly is mounted and thus offers minimum air resistance to such travel. In erected position the assembly is rigid and provides a background for the illuminated arrow which is of adequate size to meet code requirements. When in folded condition, as will be evident from FIG. 7, the lamps on the central panel are visible from the rear of the vehicle and all of these, or a portion of them may be energized periodically to provide a warning or caution signal.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

We claim:

1. A vehicle mounted sign structure of the sequentially illuminated safety arrow type, said sign structure comprising a base support member adapted to be secured to the roof of a vehicle and extending across and spaced above the vehicle, three plates of rectangular configuration which, in erected position, are disposed in horizontal edge-to-edge configuration to form a flat sign face, each of said plates carrying its portion of the sequentially energized lights making up the illuminated safety arrow, the horizontal contiguous margins of the plates being joined by hinges, spaced upright braces extending between said support member and the central one of said plates, triangularly shaped members extending from the ends of said central plate outwardly from the sign face in the direction of motion of the vehicle, the plates above and below said central plate being movable on their respective hinges to folded position in which they extend outwardly from the plane of said central plate in the direction of motion of the vehicle, the inclined margins of said triangularly shaped members defining said folded position of said upper and lower plates, whereby in folded position said sign structure presents a triangular prism configuration with the apex leading in the direction of motion of the vehicle.

2. A vehicle mounted sign structure as claimed in claim 1 in which the uppermost one of said plates is provided with vertically extending reinforcing members on one of its faces, said reinforcing members being spaced to align with said upright braces, said central plate having a flange along its upper margin which is engaged by the adjacent ends of said reinforcing members when said uppermost plate is in erected position.

3. A vehicle mounted sign structure as claimed in claim 1 in which said central plate has two spaced arms extending from the rear face of the central plate, each of said arms having a pair of articulated braces pivotally attached thereto, one of said braces of each pair being pivotally attached to said lower plate with the articulating joint of the braces being located between said plate and arm attachment of each brace, said braces being arranged in scissors configuration with the upper braces of each pair pivoting on coincident horizontal axes and the lower braces also pivoting on coincident horizontal axes, each of said braces being adapted to be angularly moved to fold upon itself to pivot said upper and lower plates on their hinges moving them into their said folded position, and power means for angularly moving said braces.

4. A vehicle mounted sign structure as claimed in claim 3 in which said power means includes a member movable rectilinearly toward and away from the rear face of said central plate, each of said braces having an elongated transverse slot adjacent its pivotal connection to said spaced arms, said member having portions extending into said transverse slots in the braces, whereby upon motion of said rectilinearly movable member a force moment is applied to said braces to angularly move them about their pivotal connection to said arms.

5. A vehicle mounted sign structure as claimed in claim 1 in which bracing struts extend from the free tips of said triangularly shaped members to said base support member.

* * * * *